(12) United States Patent
Potter et al.

(10) Patent No.: US 10,059,449 B2
(45) Date of Patent: Aug. 28, 2018

(54) SUPPLY PACKS AND METHODS AND SYSTEMS FOR MANUFACTURING SUPPLY PACKS

(71) Applicant: The Skylife Company, Inc., Rossford, OH (US)

(72) Inventors: Jeffrey J. Potter, Toledo, OH (US); Iain A. McNeil, Sylvania, OH (US); Terry C. Potter, Lambertville, MI (US); Andrew E. Potter, Sylvania, OH (US); Matthew J. Medlin, Sylvania, OH (US)

(73) Assignee: The Skylife Company, Inc., Rossford, OH (US)

( * ) Notice: Subject to any disclaimer, the term of this patent is extended or adjusted under 35 U.S.C. 154(b) by 0 days.

(21) Appl. No.: 15/890,885

(22) Filed: Feb. 7, 2018

(65) Prior Publication Data
US 2018/0178913 A1 Jun. 28, 2018

Related U.S. Application Data

(63) Continuation of application No. 14/645,668, filed on Mar. 12, 2015, now Pat. No. 9,896,206, which is a
(Continued)

(51) Int. Cl.
*B64D 1/08* (2006.01)
*B65B 11/50* (2006.01)
(Continued)

(52) U.S. Cl.
CPC ............... *B64D 1/08* (2013.01); *B64C 3/20* (2013.01); *B65B 11/50* (2013.01); *B65D 75/30* (2013.01); *B65D 75/54* (2013.01); *B65D 77/02* (2013.01)

(58) Field of Classification Search
CPC .......... B64D 1/08; B65D 75/30; B65D 75/54; B65D 77/02; B64C 3/20; B65B 11/50
See application file for complete search history.

(56) References Cited

U.S. PATENT DOCUMENTS 2,435,150 A * 1/1948 Monks ..................... B64D 1/02
244/138 A
2,667,352 A * 1/1954 Sepersky ............... A63H 27/00
124/41.1
(Continued)

FOREIGN PATENT DOCUMENTS

CA 2377291 9/2003
DE 19940743 4/2000
(Continued)

OTHER PUBLICATIONS

EP Search Report for PCT/US2011/048666, dated Jul. 24, 2015.
(Continued)

*Primary Examiner* — Valentina Xavier
(74) *Attorney, Agent, or Firm* — Remenick PLLC

(57) ABSTRACT

A cost-effective pack adapted to be distributed from an aircraft in the event of a natural, military, political, or other disaster includes an outer package, at least one item in the outer package for aerial delivery, and at least one aerodynamic component formed on the outer package and methods and systems for making the pack.

20 Claims, 13 Drawing Sheets

Related U.S. Application Data continuation of application No. 14/326,639, filed on Jul. 9, 2014, now Pat. No. 8,979,030, which is a continuation-in-part of application No. 13/215,063, filed on Aug. 22, 2011, now Pat. No. 8,794,573.

(60) Provisional application No. 61/375,423, filed on Aug. 20, 2010.

(51) Int. Cl.
    *B65D 75/54*     (2006.01)
    *B65D 77/02*     (2006.01)
    *B64C 3/20*     (2006.01)
    *B65D 75/30*     (2006.01)

(56) References Cited

U.S. PATENT DOCUMENTS

| | | | |
|---|---|---|---|
| 2,687,263 A | | 8/1954 | Frieder et al. |
| 2,790,284 A | * | 4/1957 | Hultkrans ............ B65B 31/024 |
| | | | 53/405 |
| 3,115,831 A | | 12/1963 | Suter |
| 3,168,267 A | * | 2/1965 | Ferris ...................... B64D 1/02 |
| | | | 244/138 A |
| 3,279,594 A | * | 10/1966 | Worthington, III .. B65D 85/546 |
| | | | 206/312 |
| 3,401,905 A | | 9/1968 | Rohrlick |
| 3,446,458 A | | 5/1969 | Rogallo |
| 3,491,632 A | | 1/1970 | Dovey et al. |
| 3,724,788 A | | 4/1973 | Petry et al. |
| 3,818,129 A | | 6/1974 | Yamamoto |
| 3,869,842 A | | 3/1975 | Verbeke |
| 4,121,755 A | | 10/1978 | Meseke et al. |
| 4,241,890 A | | 12/1980 | Pearson |
| 4,349,168 A | | 9/1982 | Barnes |
| 4,374,578 A | | 2/1983 | Banks |
| 4,624,407 A | * | 11/1986 | Janhonen ............... B65D 75/38 |
| | | | 229/800 |
| 5,149,019 A | * | 9/1992 | Stenlund ................ B64D 17/78 |
| | | | 244/145 |
| 5,269,119 A | | 12/1993 | Tolson |
| 5,284,454 A | * | 2/1994 | Randolph .............. A63H 27/12 |
| | | | 446/36 |
| 5,295,580 A | | 3/1994 | Hicks |
| 5,771,667 A | | 6/1998 | McGregor et al. |
| 5,779,052 A | | 7/1998 | Woodford et al. |
| 5,947,419 A | * | 9/1999 | Warren .................. B64D 19/02 |
| | | | 102/384 |
| 6,098,798 A | | 8/2000 | Abbott |
| 6,231,284 B1 | | 5/2001 | Kordel |
| 6,595,344 B1 | | 7/2003 | Davis et al. |
| 6,712,317 B1 | | 3/2004 | Warren et al. |
| 6,817,578 B1 | | 11/2004 | Garcia et al. |
| D500,523 S | * | 1/2005 | Amortegui ..................... D20/21 |
| 8,794,573 B2 | * | 8/2014 | Potter ..................... B65B 11/50 |
| | | | 244/142 |
| 8,979,030 B2 | | 3/2015 | Potter et al. |
| 2003/0197095 A1 | | 10/2003 | Preston |
| 2005/0029335 A1 | | 2/2005 | Abernathy |
| 2006/0025293 A1 | * | 2/2006 | Moen .................... B31F 1/2813 |
| | | | 493/84 |
| 2007/0164023 A1 | | 7/2007 | Lapoint |
| 2008/0219830 A1 | | 9/2008 | Wells |
| 2009/0272852 A1 | * | 11/2009 | Reynolds ................. B64D 1/08 |
| | | | 244/138 A |
| 2011/0133036 A1 | | 6/2011 | Goddard et al. |
| 2012/0043426 A1 | * | 2/2012 | Potter ..................... B65B 11/50 |
| | | | 244/142 |
| 2012/0325693 A1 | | 12/2012 | Mooney et al. |
| 2013/0334371 A1 | * | 12/2013 | Potter ..................... B64D 1/12 |
| | | | 244/137.1 |
| 2014/0263840 A1 | * | 9/2014 | Potter ................. B65D 88/027 |
| | | | 244/142 |
| 2015/0291298 A1 | | 10/2015 | Potter et al. |

FOREIGN PATENT DOCUMENTS

| | | |
|---|---|---|
| GB | 776950 | 6/1957 |
| GB | 00829401 | 3/1960 |
| JP | 309981 | 12/1990 |
| JP | 162295 | 7/1996 |
| JP | 134004 | 6/2013 |
| WO | WO03016135 | 2/2003 |

OTHER PUBLICATIONS

SG Office Action for Application No. 2013012034, dated Feb. 3, 2015.
SG Office Action for Application No. 2013012034, dated Oct. 22, 2015.
JP Office Action for Application No. 2013-526072, dated Dec. 15, 2015.
EP Office Action for Application No. 11818897.8, dated Apr. 6, 2016.
EP Search Report for Application No. 16206323.4-1708, dated May 16, 2017.
Russia Office Action for PCT/US2011/048666, dated Dec. 2, 2014.
PCT Patentability Report for PCT/US2013/031991, dated Sep. 16, 2014.
PCT Search Report for PCT/US2013/031991, dated Jun. 25, 2013.
Singapore Office Action for Application No. 3013012034, dated Jul. 3, 2014.
PCT Patentability Report for PCT/US14/036430, dated Sep. 4, 2014.
CN Office Action for PCT/US2011/048666, dated Jun. 25, 2014.
PCT Search Report for PCT/US11/48666 dated Jan. 31, 2012.
PCT Patentability Report for PCT/US11/48666 dated Jan. 31, 2012.
JP Office Action for PCT/US2011/048666, dated Jul. 10, 2014.

\* cited by examiner

SUPPLY PACKS AND METHODS AND SYSTEMS FOR MANUFACTURING SUPPLY PACKS

CROSS REFERENCE TO RELATED APPLICATIONS

This application is a continuation of U.S. patent application Ser. No. 14/645,668 of the same title filed Mar. 12, 2015, which is a continuation of U.S. patent application Ser. No. 14/326,639 of the same title filed Jul. 9, 2014, which is a continuation-in-part of U.S. patent application Ser. No. 13/215,063 of the same title filed Aug. 22, 2011, which claims priority to U.S. Provisional Application No. 61/375,423, entitled, "*Emergency Supply Pack and a Method and System of Making and Distributing the Emergency Supply Pack*," filed Aug. 20, 2010, each of which is hereby incorporated herein by reference.

BACKGROUND

1. Field of the Invention

The present invention relates to packs and methods and systems for manufacturing the packs. More particularly, the invention is directed to cost-effective packs adapted to be distributed from an aircraft and methods and systems for manufacturing the packs.

2. Description of the Background

Numerous circumstances require the transport and delivery of various kinds of cargo to inaccessible or remote areas where ground transportation is not possible or timely. For example, in the event that people are trapped or disabled in a remote area, a hostile environment, or an area ravaged by a natural disaster, it may become necessary or desirable to supply them with food, water, medicine, shelter, and other supplies as rapidly as possible. Similarly, in times of warfare, battlefields may be in remote locations or hostile environments. Likewise, it may be necessary to deliver supplies such as fuel to stranded people. Of course, in times of war or other hostilities, it may be essential to provide support to permit the stranded personnel to evacuate the position in which they find themselves.

Many remote locations or hostile environments may be in areas such as deserts or large expanses of otherwise uninhabited or inhospitable terrain. Because of the remoteness of a location or its inaccessibility, supplies are often delivered by air drops from airplanes or helicopters. In the event of natural disasters and other emergencies, time may be of the essence to deliver sustenance, medicine, or other critical items to people cut off from life-sustaining supplies. For example, it might be essential to provide water to people cut off from a clean water supply in the event of flooding, an earthquake, and/or a hurricane.

While in an emergency, the cost of packaging and delivering supplies to those in need may be considered secondary, it is nevertheless important to provide packaging for the supplies that can be formed and distributed on a reasonably cost-effective basis. Also, the space taken up by the containers or packages, as well as the amount and cost of material from which the containers are fabricated, should be minimized to increase the cost effectiveness thereof.

In the past, relief supplies have been delivered by dropping pallets of supplies by parachutes connected to containers. Typically, large amounts of supplies are stacked on multiple pallets and parachutes are connected to the pallets. However, parachutes are expensive and are typically not recoverable. Moreover, the parachutes may be quite large and cumbersome. The size of the parachutes depends on the particular supplies to be distributed. If the parachutes are undersized, the containers descend at a rapid rate and the container may be ruptured and the contents thereof lost, or people on the ground may be harmed by the rapidly-descending containers. Furthermore, if the supplies are stacked together on a pallet and the pallet air drop is off target, the supplies may be unrecoverable by those in need. Even if the pallet of supplies is recoverable, bandits or guerillas have been known to hoard the supplies and either keep them from people in need or ransom the supplies.

There is a continuing need for a cost-effective package for emergency supplies that may be easily air dropped and distributed to a large number of people with a minimized risk of damage to the supplies and harm to the people collecting the supplies. Additionally, there is a continuing need for a method and system for manufacturing the packages.

SUMMARY OF THE INVENTION

In concordance with the instant disclosure, a cost-effective pack for supplies that may be easily air dropped and distributed to a large number of people with a minimized risk of damage to the supplies and harm to the people collecting the supplies has surprisingly been discovered. Additionally, a method and system for manufacturing the cost-effective packs has surprisingly been discovered.

One embodiment of the invention is directed to a pack for aerial distribution of one or more items to persons on the ground. The pack comprises an outer package, at least one item disposed in the outer package, at least one ridged element coupled to the outer package, and at least one aerodynamic component extending from the outer package, wherein the aerodynamic element reduces descent rate of the pack in comparison to freefall.

In a preferred embodiment, the outer package is comprised of a pair of superposed sheets having opposing faces that are joined together. Preferably, the superposed sheets are comprised of a plurality of layers. In a preferred embodiment, at least one inner package is confined within the outer package. The at least one inner package preferably allows the at least one item to move freely or in a specified range within the inner package. In a preferred embodiment, the at least one item is fixed within the inner package. Preferably, the at least one inner package is coupled to the outer package. The pack of claim 1, wherein the at least one aerodynamic component extends from an edge of the outer package.

In a preferred embodiment, the outer package and the aerodynamic component are manufactured of the same material and as a single unit. Preferably the at least one aerodynamic component includes a pair of wings configured to unfurl during an aerial delivery of the pack. The pair of wings is preferably formed by folding corresponding side edges of the sheets and sealing the folded edges to form wing seals. The at least one aerodynamic component is preferably one or more of a tail, a fin, an airfoil, a parasail, a parachute, rotary blades, streamers, a tail, tunnels, dimples, vent slits, scalloped edges, or serrated edges.

In a preferred embodiment, the at least one rigid insert is disposed within the outer package. Preferably, the at least one rigid insert includes instructions related to the item for aerial delivery. Preferably, the pack contains no moving parts or electronics.

Preferably, the outer package includes a perforation to facilitate opening of the outer package. The perforation preferably extends inwardly from an edge of the pack and permits access to the item.

The at least one item is preferably chosen from the group consisting of one or more of mosquito netting, a tent, a blanket, one or more tools, one or more communication, navigation, heating, location or illumination devices, one or more batteries, a shelter, clothing, foot protection, rain gear, one or more hygienic supplies, one or more first aid supplies, ammunition or weapons, one or more parts for vehicles or equipment, one or more water purification supplies, one or more filters to remove contaminants from water, and video or paper information. In a preferred embodiment, the at least one item is a chosen from the group consisting of food, water, a medication, a fire-starting kit, and a fuel.

The pack preferably contains at least one alerting device. The at least one alerting device is preferably chosen from the group consisting of a whistle, a buzzer, a beeper, a light, and a glowing film. The pack also preferably contains a tracking device.

In a preferred embodiment, there are perforations within the outer package that create a handle when separated. Preferably, the outer package is vacuum sealed. In a preferred embodiment, the ridged element is one or more of cardboard, paper, plastic, ribs, metal, embossed surfaces, vacuum sealed portions, pressurized chambers and chambers filled with gas. Preferably, at least a portion of the outer package is filled with one or more of helium and hydrogen.

Another embodiment of the invention is directed to a method for manufacturing a pack. The method comprising the steps of providing a first sheet, depositing at least one item for aerial delivery to persons on the first sheet, disposing a second sheet over the at least one item and the first sheet, sealing the first sheet and the second sheet to form an outer package housing the at least one item, and forming at least one aerodynamic element on the outer package, wherein the aerodynamic element causes turbulent air flow across the outer package and reduces freefall descent rate of the pack in operation.

Preferably, the step of sealing the first sheet and the second sheet includes forming a top edge seal, a bottom edge seal, and spaced apart side edge seals. In a preferred embodiment, the step of sealing the first sheet and the second sheet includes forming a pair of mid-pack seals, the at least one item confined within the outer package by the pair of mid-pack seals, the top edge seal, and the bottom edge seal. The step of forming the at least one aerodynamic component preferably includes folding corresponding side edges of the first sheet and the second sheet to form folded edges. Preferably, the folded edges are sealed to form one or more wing seals. The one or more wing seals are preferably formed between one of the side edge seals and one of the mid-pack seals.

The method preferably includes a step of coupling an inner package to the outer package, the inner package containing the at least one item. Preferably, a top edge and a bottom edge of the inner package is sealed between the first sheet and the second sheet with a top transverse seal and a bottom transverse seal to couple the inner package to the outer package. In a preferred embodiment, the method also includes creating perforations within the first layer that facilitate opening of the pack. The perforations preferably extend inwardly from an edge of the pack and permits access to the inner package.

Preferably, the at least one item is selected from the group consisting of a mosquito netting, tent or shelter, a blanket, one or more tools, illumination, communication, heating or navigation devices, one or more batteries, rain gear, clothing, foot protection, hygienic supplies, ammunition or weapons, one or more parts for a vehicle or equipment, one or more first aid supplies, one or more water purification supplies, a filter, and video or paper informational instructions. In a preferred embodiment, the at least one is selected from the group consisting of food, water, medication, combustion materials, and fuel.

Another embodiment of the invention is directed to a system for manufacturing a pack. The system comprises a product loading unit for depositing at least one item for aerial delivery between a first sheet and a second sheet, a longitudinal mid-pack and edge sealing unit, a transverse heat sealing unit, the longitudinal mid-pack and edge sealing unit and the transverse heat sealing unit configured to seal the first sheet and the second sheet to form an outer package housing the at least one item, a wing folding unit, and a wing band sealing unit. The wing folding unit and the wing band sealing unit are configured to form one or more wings on the outer package. The one or more wings reduce the freefall descent rate of the pack during operation.

Preferably there is a perforator unit disposed between the transverse heat sealing unit and the wing folding unit. The perforator unit preferably forms a perforation to facilitate an opening of the pack. In a preferred embodiment, the perforator unit includes a perforation roll with a perforation blade disposed opposite an anvil roller.

In a preferred embodiment, the system also includes a guillotine package separator unit disposed adjacent the wing band sealing unit. The guillotine package separator unit preferably cuts along at least a portion of the perforation to form individual ones of the pack. Preferably there is at least one vacuum plenum for securing the first sheet to a conveyor for movement through the system.

Another embodiment of the invention is directed to a pack for distribution by an aircraft to persons on the ground. The pack comprises an outer package, at least one item disposed in the outer package, and at least one aerodynamic element attached to and extending from the outer package. The aerodynamic element has no moving parts and reduces freefall impact force of the pack so that the at least one item disposed in the outer package is not damaged upon contact with the ground and the pack poses a minimal risk of harm to the persons on the ground.

Another embodiment of the invention is directed to a pack for aerial distribution of one or more items to persons on the ground. The pack comprises an outer package, at least one item disposed in the outer package, and a pair of wings extending from the outer package configured to unfurl during an aerial delivery of the pack. The pair of wings reduce the descent rate of the pack in comparison to freefall.

Other embodiments and advantages of the invention are set forth in part in the description, which follows, and in part, may be obvious from this description, or may be learned from the practice of the invention.

DESCRIPTION OF THE INVENTION

Figure 1:
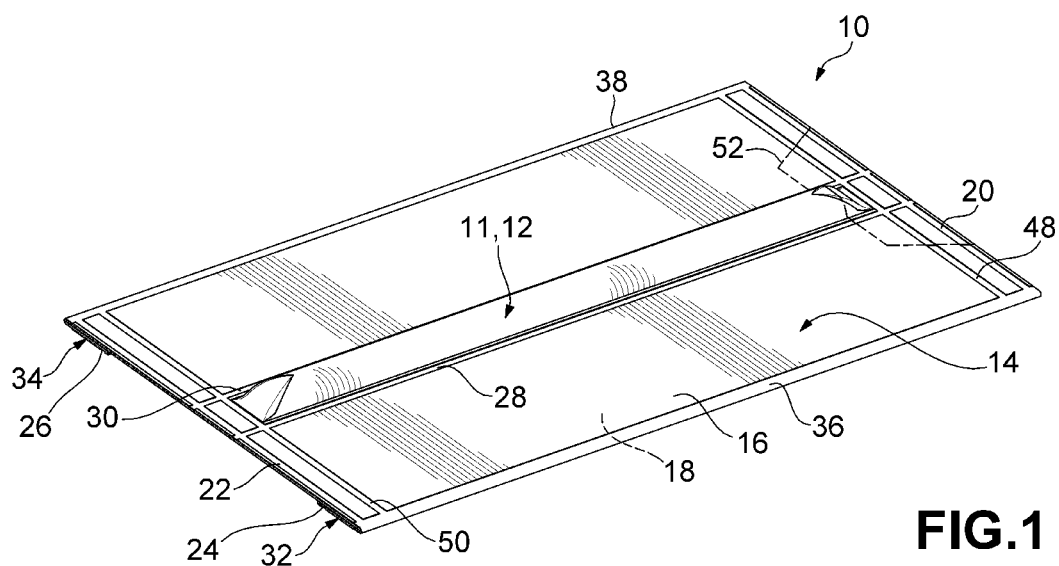
FIG. 1 is a top perspective view of an emergency pack according to one embodiment of the disclosure, the emergency pack shown in a formed position.

Providing supplies to a population under emergency conditions is an extremely risky undertaking. Typically, transportation infrastructures have been disrupted, for example, by natural disasters or political or social upheaval. It is often difficult or impossible to truck relief supplies to the disaster area because roads are destroyed and/or access points are blocked. In addition, the relief workers themselves are placed in danger, which may be from environmental concerns (e.g. floods, mudslides, earthquakes, radiation) or dangerous military actions on the ground. Providing supplies by air is often the only viable option in a disaster, but there are still many problems. Because supplies are provided in bulk, the process generally requires precise targeting and coordination with those on the ground to avoid damage to the supplies themselves, damage to structures on the ground, and harm to persons and animals. Whether delivered by truck, ship, or aircraft, supplies are often stolen or confiscated by governments or persons wishing to establish regional political or military dominance. Consequently, the cost of delivery is high and the effectiveness of providing real relief is minimal.

It has been surprisingly discovered that a cost-effective pack of supplies can be manufactured and air dropped for distribution to large numbers of people with a minimized risk of damage to structures on the ground, to the supplies themselves, and with minimal risk of harm to people and animals on the ground, all while maximizing the receipt of supplies to those in need. Whereas conventional delivery methods typically maximize the quantity delivered, such as bulk delivery by truck, ship, or air, the invention described herein is directed to delivering large numbers of low-weight packs by air so that the packs are distributed evenly and randomly over a large predetermined area. Delivering large numbers packs over a region makes it difficult or impossible for all supplies to be stolen or otherwise sequestered by individuals who are not the intended recipients. This effectively destroys the black market potential that can be created when supplies are delivered in bulk, whether that delivery is by truck, ship or air, and, more importantly, maximizes the quantity of supplies received by the targeted persons.

Preferably, each pack is configured as a single delivery unit and packs are delivered in large numbers, so the risk of supplies not reaching the intended victims or being otherwise stolen is minimized. As aspect on the invention is therefore the rapid construction and assembly of packs in large numbers. Single station, and semi automated manufacturing apparatus are configured to produce thousands to tens of thousands of packs per day. Packs preferably contain one or only a few rations of the supplies such as, for example, food, water, or medicine. Although the supply lasts for a short time, because costs are minimized, deliveries can be repeated many times and with minimal risk to those involved. Importantly, because packs are delivered by air, relief workers never need to enter the disaster area itself. Also, depending on the aerodynamic components of the pack, distribution can be from almost any altitude, again keeping relief workers safe from danger.

Packs are capable of being distributed or broadcast over a wide area or targeted to a precise or limited location, again so as to minimize the risk of theft and/or to reach a target area that is itself limited or small. The range is preferably pre-determined so as to maximize distribution to individuals in need as compared to palette distribution by truck, air, or ship.

Packs are configured to possess an aerodynamic component to reduce or eliminate acceleration produced by gravity. Because pack weights are small as compared to bulk supplies, the aerodynamic component is correspondingly minimized. Preferably the packs themselves are aerodynamically designed so that the rate at which the packs fall to the ground is minimized as compared to freefall. Preferably the packs hit the ground at speeds that pose little to no risk of damage to structures, other things on the ground, or the contents of the packs themselves, and little to no risk of harm from to persons or animals (i.e. from the pack landing on a person or animal during descent). The rate and speed are precisely controlled by the aerodynamic component of the pack itself by introducing one or more drag and/or lift elements. Drag can be induced from lift or parasitic as a consequence of the structure of the component. Aerodynamic components that can be added include, but are not limited to one or more wings, fins, tail structures, propellers or rotary blades, airfoils, sails or parasails, streamers, tunnels, dimples, vent slits, scalloped edges, serrated edges and parachutes. Preferably, wings or airfoils are configured to force the pack to circle or oscillate while descending so as to localize pack delivery to a limited area. While weather conditions can still be problematic, when known or predicted in advance, specific aerodynamic components can be configured by one skilled in the art to adjust the trajectory of the packs and therefore account for expected transverse movement of the pack through the air while descending. Also, pack distribution can be monitored by radar (e.g. doppler) or tracking devices within each pack (e.g. GPS) to plot broadcast distribution patterns over various terrain and in various weather conditions. Those patterns can be used to determine optimal distribution or determine if re-distribution is necessary. Design configurations may include, for example, ailerons and rudder structures that may be fixed to predetermined positions, wings and/or leading edges set at a predetermined shape or angle of attack, asymmetric loading of the supplies in the pack itself and/or combinations thereof.

Preferably, packs, including the aerodynamic components, are manufactures as single units to minimize manufacturing costs. Also preferable, supply items are inserted into the packs during the manufacturing process, again to minimize costs.

As embodied and broadly described, the disclosures herein provide detailed embodiments of the invention. However, the disclosed embodiments are merely exemplary of the invention that is embodied in various and alternative forms. Therefore, there is no intent that specific structural and functional details should be limiting. , but rather, the intention is that they serve as a representative basis for teaching one skilled in the art to variously employ the present invention.

FIGS. 1-10 illustrate a pack 10 with an item 11 for aerial delivery. The pack 10 includes an inner package 12 and an outer package 14. The inner package 12 may be disposed along a substantially central longitudinally extending axis of the outer package 14, for example. The inner package 12 either is the item 11 for aerial delivery, or houses the item 11 for aerial delivery. For example, the item 11 may be a mosquito net or water disposed in the inner package 12. In the embodiment shown, each of the inner package 12 and the outer package 14 of the pack 10 has a quadrilateral shape in plan view. It should be appreciated that the inner package 12 and the other package 14 may have other shapes in plan view, such as a circle, an oval, a triangle, an asymmetrical shape, and the like, as desired Likewise, an overall size of the pack 10 will depend on a number of factors, including the size and weight of contents of the inner package 12, including the item 11 for delivery. In a preferred embodiment, the dimensions of the outer package are 300 mm by 150 mm, 350 mm by 200 mm, 400 mm by 300 mm, 450 mm by 200 mm, or another size. The ratio of size to weight can be adjusted as required to change the aerodynamic features of the pack 10.

The outer package 14 may be formed from a polymeric material, such as polyethylene, polystyrene, polypropylene, for example, or another polymer. In certain embodiments, the outer package 14 is formed from a biodegradable material, such as a polyvinyl alcohol (PVA). In preferred embodiments, the outer package 14 may also be formed from a mesh material. In preferred embodiments, the outer package 14 is formed from a high performance barrier plastic. For example, the high performance barrier plastic can be an oxygen or carbon dioxide scavenger or barrier. Additionally, outer package 14 may be made of numerous layers. For example, outer package 14 may have inner and outer layers of polyethylene or polystyrene (e.g., BoPET or mylar), and a middle layer of rip-stop nylon. Furthermore, there may be adhesive between the layers, layers that promote heat seals, layers that provide optical clarity or opaqueness, and/or layers that provide electrical conductivity such as layers of carbon nanotubes (e.g. single, double or multi-walled), layers of mylar containing fine electrically conductive wire mesh or metal deposition (e.g., chemical vapor deposition), preferably undetectable with the unaided eye, or other electrically conductive materials. Such materials may be used to form any or all layers of the pack or of the rigid insert as desired. Furthermore, the thickness of outer package 14 can vary depending on the desired attributes of the pack 10. A skilled artisan may select suitable materials and number of layers for the outer package 14, as desired.

The inner package 12 is disposed inside the outer package 14. Where the inner package 12 houses item 11, the contents of the inner package 12 may dictate the particular material used to form the inner package 12. For example, the material forming the inner package 12 may be dictated by a desired shelf-life and storage time of the item 11 housed by the inner package 12. In preferred embodiments, the inner package 12 is formed from a polymeric material, such as polyethylene. The inner package 12 may alternatively be formed from any conventional material known in the packaging industry, materials such as a cardboard, a metal, a plastic, a fabric or a combination of the foregoing, as examples. Furthermore, inner package 12 may be made of or contain a cushioning material. For example, inner package 12 may be formed from bubble wrap or foam.

As non-limiting examples, the inner package 12 may contain or be non-perishable items 11, such as mosquito netting, a blanket, tools, illuminating devices, batteries, tents or other shelter, rain suits or other clothing and foot protection, toilet tissue, cleansing wipes, ammunition, dental hygiene supplies, parts required for vehicle or equipment repair, hunting and fishing tools, water purification pills, a filtered drinking straw to remove contaminants from water, communication and/or navigation devices, heating devices such as those chemically activated to generate heat, and video or paper informational instructions furnished to victims of a natural disaster or war. Other types of non-perishable items 11 may also be housed by the inner package 12, within the scope of the present disclosure.

Where the contents of the inner package 12 are non-perishable, the inner package 12 may particularly be formed from a biodegradable material, such as a polyvinyl alcohol (PVA), for example, or from a perforated material. Furthermore, the inner package 12 may include one or more tabs coupled to each end of the item 11 contained therein and to the outer package 14. The tabs facilitate a removal of the inner package 12 from the outer package 14, for example.

The inner package 12 may also be used for delivery of perishable items 11. For example, the inner package 12 may contain a food or a liquid that requires a substantially fluid and/or light and/or air impermeable material. Where the contents of the inner package 12 are temperature or light sensitive, such as a medication, or flammable, such as fire-starting kits, magnesium blocks for starting fires, or fuels, the inner package 12 may be formed from a thermally insulating material, for example, a metallic or composite foil. The inner package 12 may also include a heating or cooling substance or a device to maintain the contents of the inner package 12 at a desired temperature. The heating or cooling substance or device may also be contained by the outer package 14 and not merely the inner package 12. Medicinal contents of the inner package 12 may include insulin, tetanus vaccinations, Dengue-fever vaccinations, malaria vaccinations, antibiotics, and the like, as non-limiting examples. Other types of perishable items 11 may also be housed by the inner package 12, as desired.

The outer package 14 and the inner package 12 may be formed from the same material or from different materials, as desired, or manufactured as separate or an individual unit structure. A skilled artisan may select suitable materials for the inner package 12 and the outer package 14, as desired.

Figure 4:
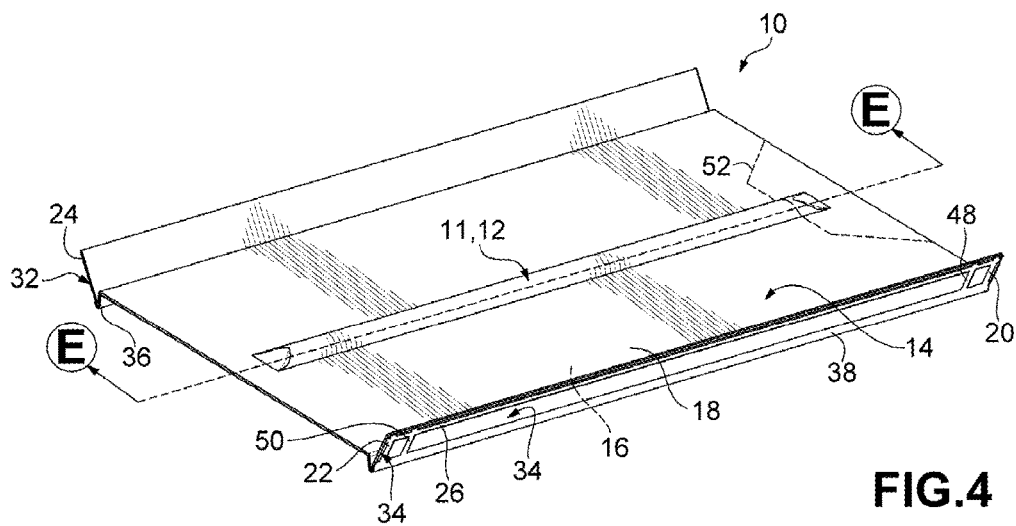
FIG. 4 is a bottom perspective view of the emergency pack illustrated in FIGS. 1-3, the emergency pack shown in a flight position.
Figure 5:
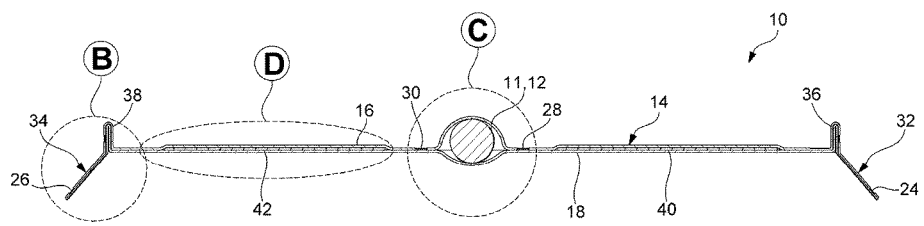
FIG. 5 is a cross-sectional front elevational view of the emergency pack taken at section line A-A in FIG. 3.
Figure 6:
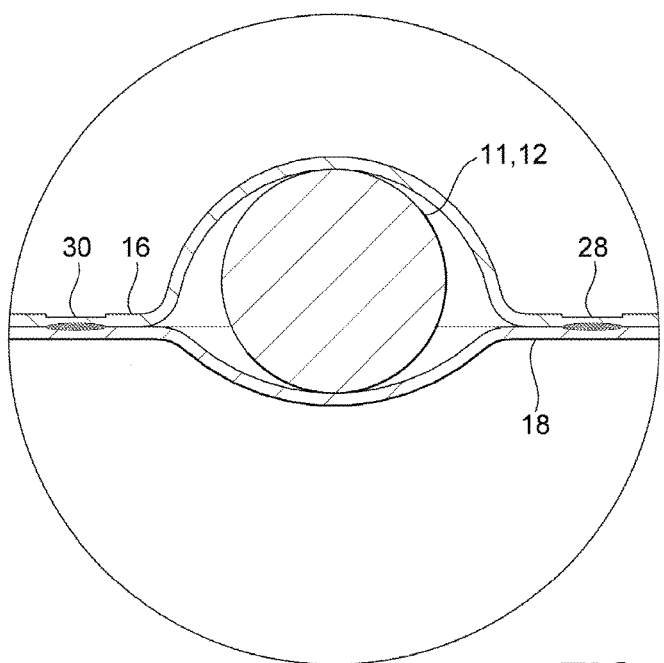
FIG. 6 is a fragmentary enlarged cross-sectional front elevational view of the emergency pack taken at callout B in FIG. 5, further showing an inner package of the emergency pack.

With renewed references to FIGS. 1-10, the outer package 14 is formed from a pair of superposed sheets 16, 18, having facing surfaces that are joined together. The top edges of the sheets 16, 18 are sealed together to form a top edge seal 20 of the pack 10 Likewise, the bottom edges of the sheets 16, 18 are sealed together to form a bottom edge seal 22 of the pack 10. The side edges of the sheet 16 are sealed to corresponding side edges of the sheet 18 to form a pair of opposing side edge seals 24, 26 of the pack 10. The facing surface of the sheets 16, 18 adjacent the inner package 12 are sealed together to form mid-pack seals 28, 30 of the pack 10. The top edge seal 20, the bottom edge seal 22, and the mid-pack seals 28, 30 confine the inner package 12 within the outer package 14, for example, as shown in FIG. 6.

Figure 2:
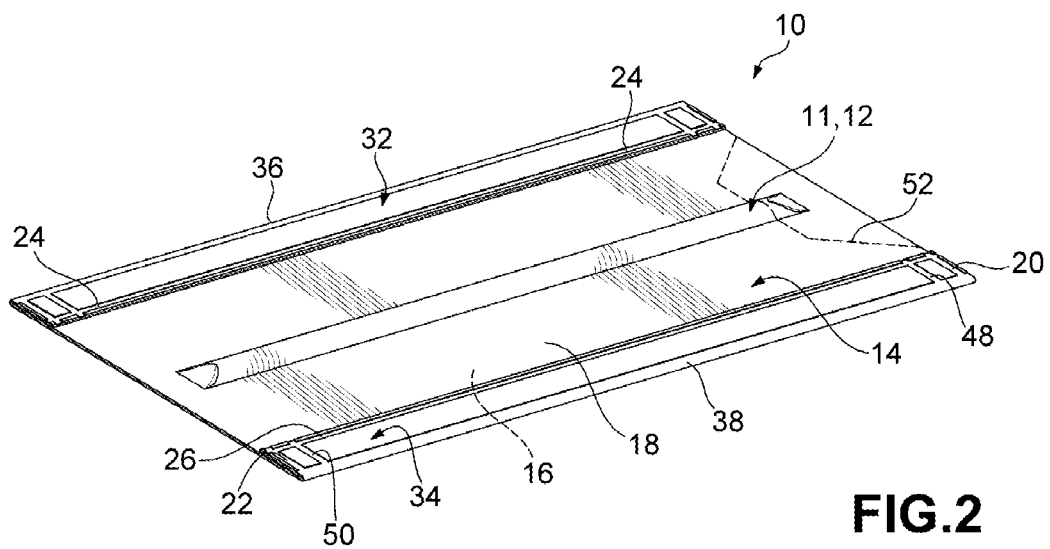
FIG. 2 is a bottom perspective view of the emergency pack illustrated in FIG. 1, the emergency pack shown in a formed position.
Figure 3:
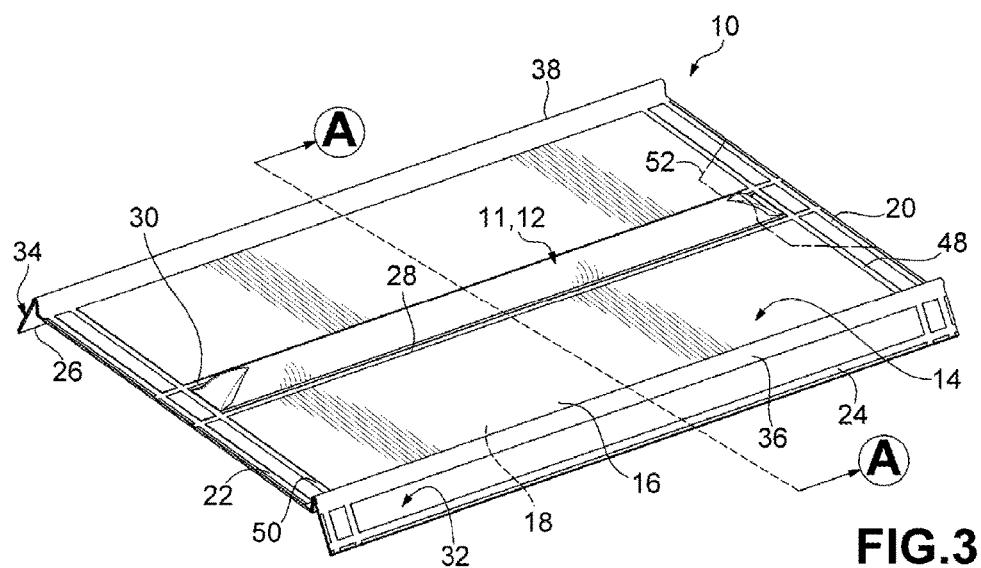
FIG. 3 is a top perspective view of the emergency pack illustrated in FIGS. 1-2, the emergency pack shown in a flight position.
Figure 7:
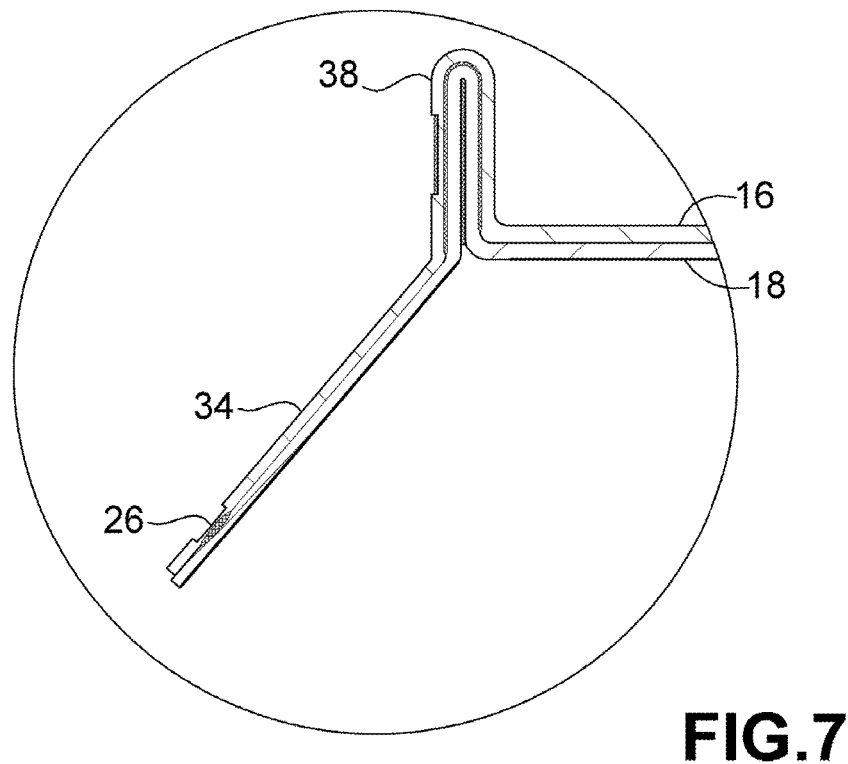
FIG. 7 is a fragmentary enlarged cross-sectional front elevational view of the emergency pack taken at callout C in FIG. 5, further showing a wing of the emergency pack.

The outer package 14 includes at least one aerodynamic component 32, 34. Aerodynamic component 32, 34 preferably creates drag during the free fall of pack 10 during use thereby slowing the descent of pack 10. Additionally, aerodynamic component 32, 34 may provide aerodynamic and stability characteristics such as lift, directional control, thrust, or weight. In the embodiment shown in FIG. 1-10, the at least one aerodynamic component 32, 34 includes a pair of flanges or wings 32, 34 formed between the side edge seals 24, 26 and the mid-pack seals 28, 30 of the pack 10. The wings 32, 34 are formed by folding corresponding side edges of the sheets 16, 18 and sealing the folded edges to form wing seals 36, 38, for example, as shown in FIGS. 5 and 7. As a result of sealing the folded edges to form the wing seals 36, 38, the wings 32, 34 normally are closed and extend inwardly along a longitudinal axis of the pack 10. The wings 32, 34, which as shown in FIGS. 1-2 are normally closed in the pack 10, unfurl as shown in FIGS. 3-4 as the pack 10 is dropped through the air. While two wings 32, 34 are depicted, any number of wings can be used. Figure depicts the stages of forming wings 32, 34. Pack 10 is feed into the wing forming mechanism at infeed 205, the first portion of the wings are formed at forming area 210, the second portion of the wings are formed at forming area 215, the third portion of the wings are formed at forming area 220, the forth portion of the wings are formed at forming area 225, the fifth portion of the wings are formed at forming area 230, the edges of the wings are sealed at edge sealing 235, the pack 10 enters reflex area 240 where the wings are flexed open 245, and finally the pack 10 is sent to the packout area 250. The individual packs are separated from the joined packages being produced via a guillotine type cutting device and then subsequently sent to packout areas.

Figure 18:
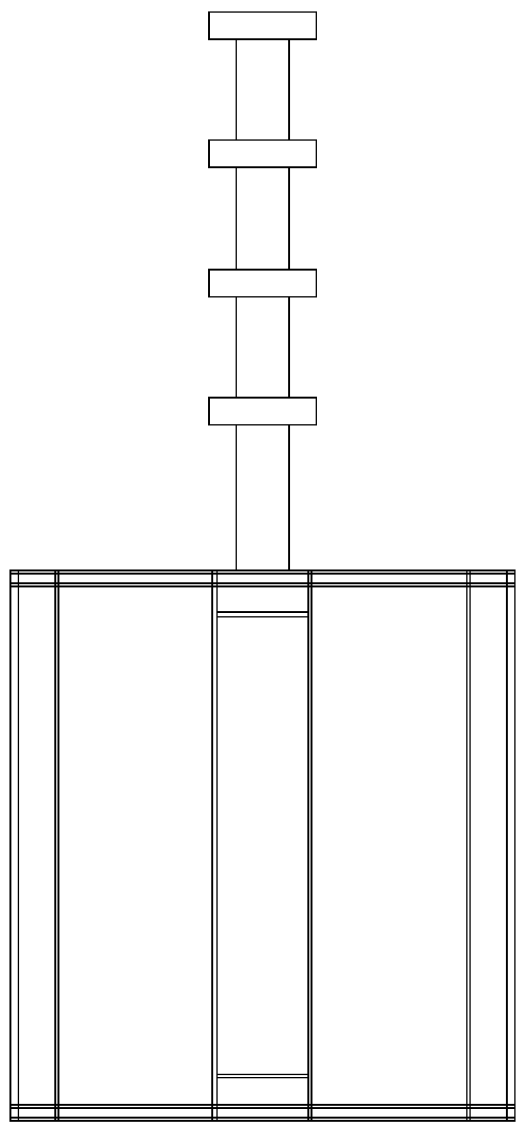
FIG. 18 is an embodiment of the pack having a tail.
Figure 19:
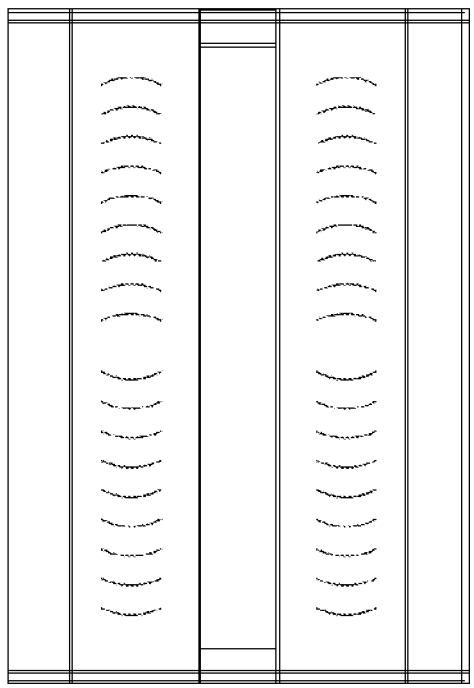
FIG. 19 is an embodiment of the pack having vent slits.
Figure 20:
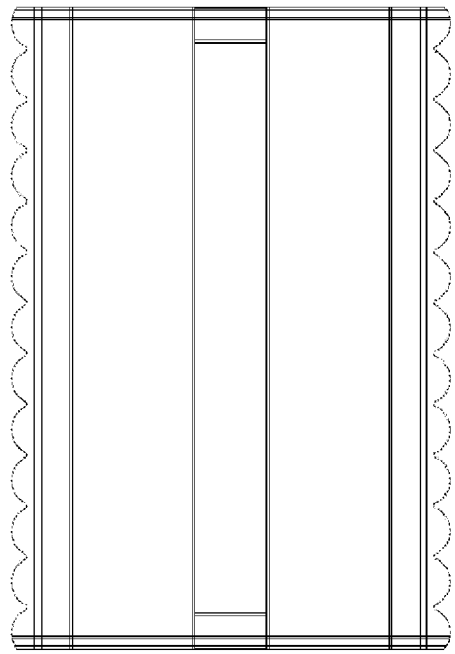
FIG. 20 is an embodiment of the pack having scalloped edges.
Figure 21:
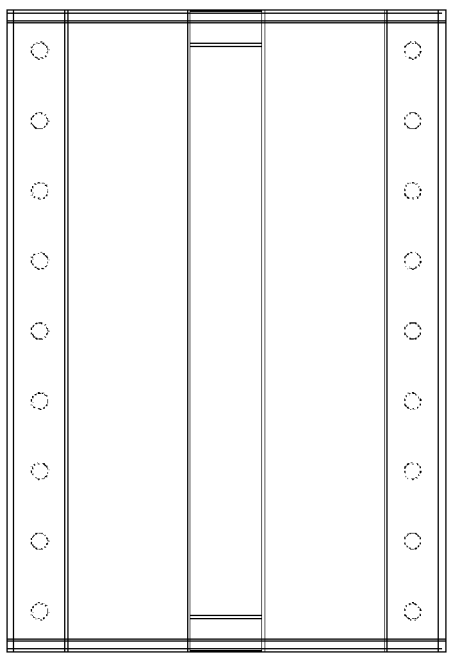
FIG. 21 is an embodiment of the pack having holes in the wings.

The at least one aerodynamic component 32, 34 may advantageously cause turbulent flow, as opposed to laminar flow, across the outer package 14 and decrease a descent rate of the pack 10 in operation. Preferably, the velocity of pack 10 is reduced from freefall to, for example, 20 meters per second, 15 meters per second, 10 meters per second, 8 meters per second, or 5 meters per second. Preferably, the impact with the ground of pack 10 is reduced from the impact of the pack with ground during freefall, for example, by 90%, 75%, 60%, 50% or another percentage. Although the embodiments shown in FIGS. 1-10 include wings 32, 34 as the at least one aerodynamic component 32, 34, one of ordinary skill in the art should understand that the at least one aerodynamic component 32, 34 may alternatively include a tail, a fin, an airfoil, a parasail, a parachute, rotary blades, streamers or a tail (see FIG. 18), or other structure adapted to create drag when the pack 10 is dropped through the air. As a non-limiting example of other types of structure, tunnels, dimples, vent slits (see FIG. 19), scalloped or serrated edges (see FIG. 20), or holes formed in the outer package 14 may be used to for create turbulent flow. Suitable aerodynamic component 32, 34 for the pack 10 may be selected, as desired. Furthermore, a combination of aerodynamic elements can be used. For example, as shown in FIG. 21, holes can be punched into wings 32, 34 to further control drop rate and/or flight characterizes.

In certain embodiments, the aerodynamic component 32, 34 control the flight path of the pack 10. For example, wings may be formed to force the pack 10 to follow a spiral descent, a zigzag descent, or a descent similar to an airplane that is landing. Such controlled descent may improve the accuracy of delivering packs 10 to a desired location.

Figure 8:
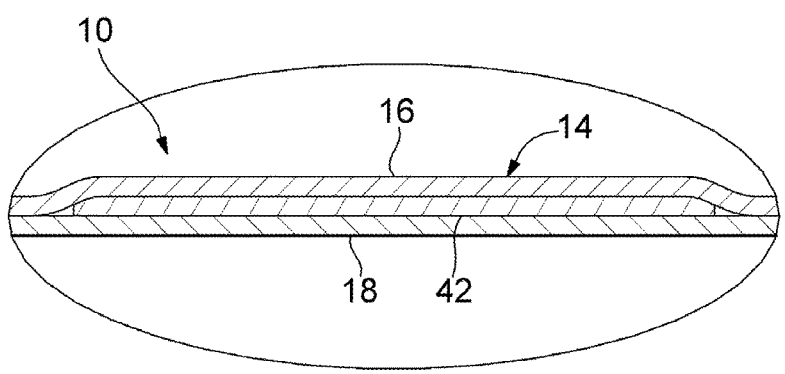
FIG. 8 is a fragmentary enlarged cross-sectional front elevational view of the emergency pack taken at callout D in FIG. 5, further showing a rigid insert in an outer package of the emergency pack.
Figure 22:
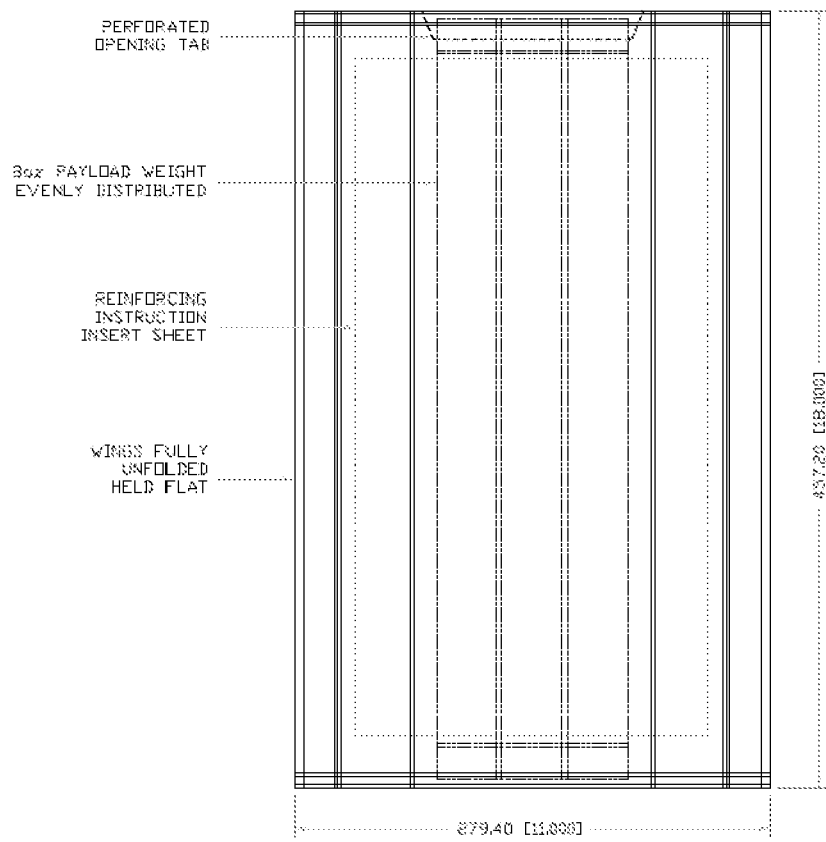
FIG. 22 is an embodiment of the pack having a reinforcing instruction insert sheet.

In certain embodiments, the outer package 14 is formed from a substantially rigid material adapted to militate against a folding of the pack 10. With reference to FIGS. 5 and 8, the outer package 14 may also include at least one rigid insert 40, 42 adapted to provide structural support to the outer package 14 and militate against an undesirable folding of the pack 10 in operation. For example, the rigid inserts 40, 42 may be elongate members sealed and disposed between the mid-pack seals 28, 30 and the wing seals 36, 38 of the outer package 14. The rigid inserts 40, 42 may include ribs laterally oriented within the outer package 14, or supports longitudinally oriented within the outer package, for example. The rigid inserts 40, 42 may also be coupled to the outer package 14 during the formation of the top edge seal 20 and the bottom edge seal 22. It is understood that the inserts 40, 42 may be coupled to the top edge seal 20 and the bottom edge seal 22, as desired. The inserts 40, 42 may also be disposed adjacent the inner package 12 or coupled to an exterior of the outer package 14. In a preferred embodiment, the rigid inserts 40, 42 may include stiff or folded paper informational instructions for users of the contents of the pack 10 (see FIG. 22). In other embodiments, the rigid inserts 40, 42 are cardboard or plastic inserts having a stiffness sufficient to militate against a folding of the outer package 14. One of ordinary skill in the art may select a suitably rigid material for the inserts 40, 42, as desired with maintaining the desired flexibility. Outer package 14 can also have embossed surfaces, vacuum sealed portions, pressurized chambers and/or chambers filled with gas (e.g. helium, hydrogen, or air) to adjust the stiffness of the pack 10.

Figure 9:
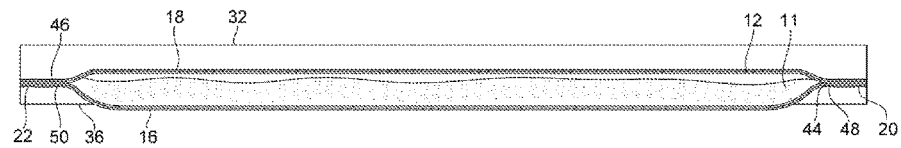
FIG. 9 a cross-sectional side elevational view of the emergency pack taken at section line E-E in FIG. 4, further showing an inner package of the emergency pack connected with an outer package of the emergency pack according to one embodiment of the disclosure, the inner package shown with a liquid material disposed therein.
Figure 10:
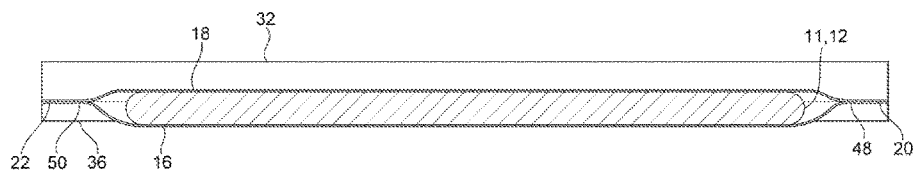
FIG. 10 is a cross-sectional side elevational view of the emergency pack taken at section line E-E in FIG. 4, the inner package of the emergency pack shown consisting of a solid material.
Figure 23:
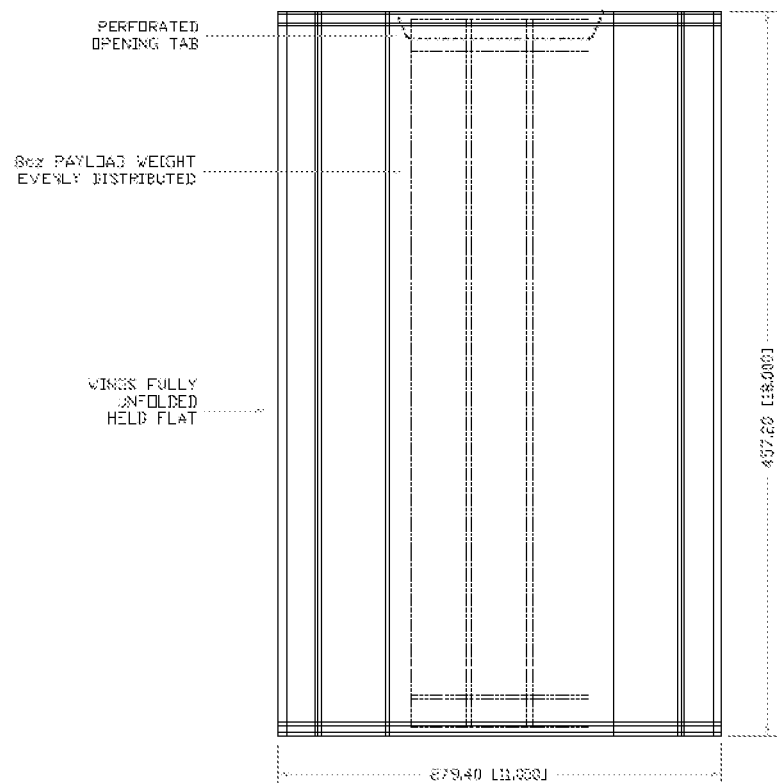
FIG. 23 is an embodiment of the pack having an evenly distributed payload.

As established hereinabove, the inner package 12 either is the item 11 for aerial delivery, or houses the item 11 for aerial delivery. As shown in FIG. 9, where the inner package 12 houses the item 11 for delivery, for example, water, the inner package 12 may be coupled with the outer package 14. In particular, a top edge 44 and a bottom edge 46 of the inner package 12 may be sealed between the sheets 16, 18 with a top transverse seal 48 and a bottom transverse seal 50, respectively. As shown in FIG. 10, where the inner package 12 is the item 11 for aerial delivery, the inner package may be loosely disposed between the sheets 16, 18 of the outer package 14. A plurality of the items 11 individually, or packaged within a plurality of the inner packages 12, may also be substantially evenly distributed within the outer package 14 of the pack 10. It should also be appreciated that the inner packages 12 may also be substantially evenly distributed along a length of the outer package 14 in order to provide a balanced weight distribution and facilitate the delivery of the pack 10 through the air (see FIG. 23). Other means for disposing the inner package 12 within the outer package 14 of the pack 10, and any number of items 11, may be used as desired. Furthermore, more than one inner packages 12 may be disposed throughout outer package 14. Preferably, the inner packages are disposed evenly to evenly distribute the weight throughout outer package 14. In a preferred embodiment, item 11 is allowed to move freely within inner package 12. In a preferred embodiment, pack 10 holds 100 grams, 200 grams, 300 grams, 400 grams, 750 grams, 1 kilogram, 2 kilograms or another amount of item 11. The size, flexibility, aerodynamic element(s), material, and positioning of item 11 can all be adjusted depending on the weight and contents of item 11. Furthermore, item 11 can be position so that pack 10 has a positive static stability, a neutral static stability, or a negative static stability.

Preferably, the content of pack 10 is a single serving or ration of item 11. For example, the contents can be a single serving of water, a single nutrition bar, a first aid kit, or a sanitation kit. In embodiments where pack 10 holds a single serving of item 11, distribution of the packs is achieved during the airdrop since the packs will preferably be evenly and randomly distributed across the drop zone.

It is understood that the various seals 20, 22, 24, 26, 28, 30, 36, 38, 48, 50 of the present disclosure may be formed by a chemical sealing operation, such as by use of an adhesive or a chemical solvent, for example, or by a heat welding operation, as desired. In particularly illustrative embodiments, the various seals 20, 22, 24, 26, 28, 30, 36, 38, 48, 50 are formed by heat sealing operations. Alternative means for forming the various seals 20, 22, 24, 26, 28, 30, 36, 38, 48, 50 may also be employed, as desired.

Figure 24:
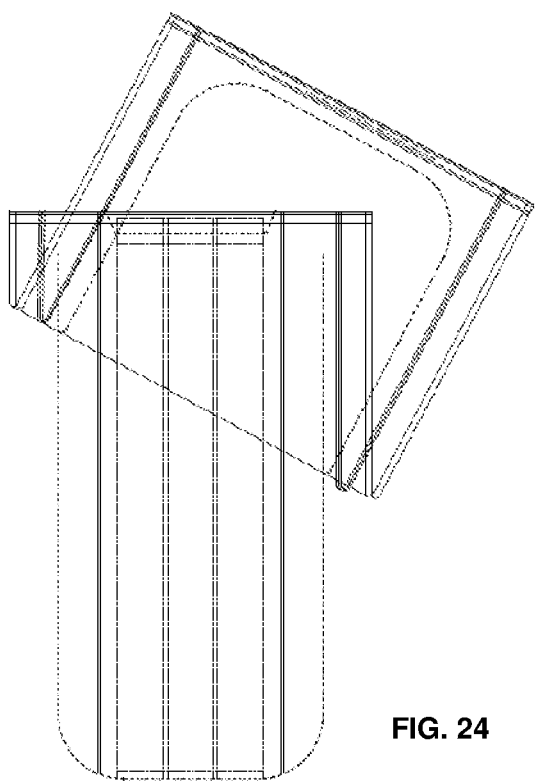
FIG. 24 is an embodiment of the pack having perforations for creating handles.
Figure 25:
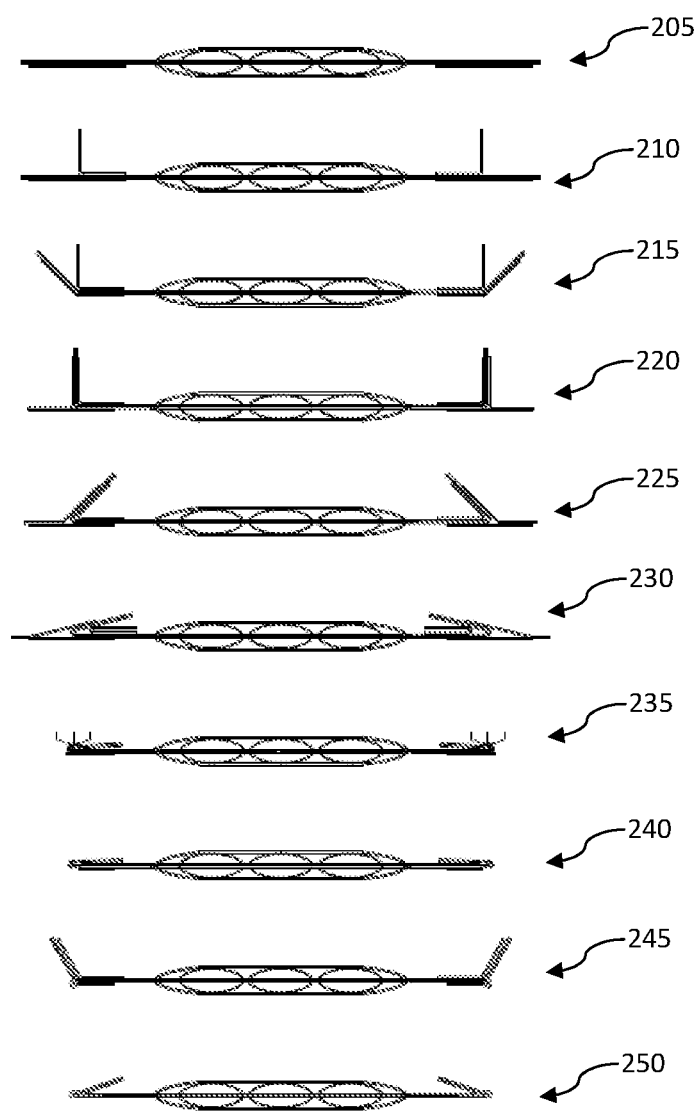
FIG. 25 depicts the formation of the wings.

The pack 10 of the present disclosure may further include a perforation 52 to facilitate an opening of the pack 10. The perforation 52 may be a tamper-proof or tamper-evident perforation 52. The perforation 52 may extend inwardly from an edge of the emergency pack and traverse at least one of the top edge seal 20, the bottom edge seal 22, the top transverse seal 48, and the bottom transverse seal 50, in order that the same seals may be opened to permit access to the inner package 12 and the item 11 for aerial delivery by an end user of the pack 10. Additional, as shown in FIG. 24, perforations may be added to form a pouch with a carrying handle.

As established herein, the outer package 14 is adapted to contain the inner package 12. The outer package 14 may also contain an illuminating device to facilitate visible location of the pack 10, particularly at night, such as a flashing LED, glowing film, or a reflective device, for example. The illumination device may be activated by time, temperature, pressure, or impact, for example. Alternatively, the outer package 14 may be formed from a radar reflective material or a radar dissipating coating. In certain embodiments, the outer package 14 is formed from or coated with a light-activated substance. The outer package 14 may also contain a tracking device such as a GPS device, an RFID device, and the like to facilitate tracking of the pack 10 or for inventory control. Furthermore, the packaging may contain a noise generating device. For example the packaging may contain a whistle, buzzer, or beeper that is activated as the air passes over the packaging, electrically, or mechanically. The noise generating device can announce the arrival and location of the packs as they drop or at the drop location. In certain embodiments, pack 10 has no moving parts, electric parts, or mechanical parts.

The outer package 14 may include and/or the pack contains indicia. The indicia may include a colored material or a symbol to indicate the contents thereof. For example, blue indicium may indicate that the item 11 is water, a Red Cross indicium may indicate that the item 11 includes medical supplies, and the like. The indicia may also include instructions in a plurality of languages or graphical instructions for opening the pack 10 and to indicate the use of the contents thereof. Indicia may contain additional information such as, for example, cryptographic information, information only pertinent to one or more of the intended recipients, steganographic information including but not limited to key-dependent information, embedded messages and/or images, which may be visible or invisible to the naked eye, obscured in other text or images, contained within the microstructure such as with Infrastruct or as otherwise disclosed in U.S. Patent Application Publication Nos. 20140037131, 20140025952, 20130329938, 20130101059 and 20110135146, each of which is incorporated by reference in its entirety.

In certain embodiments, the packs 10 may be colored, textured, contain designed or planned imperfections (e.g. micro-bubbles, micro-fractures) or otherwise marked in two or three dimensional format. For example, the packs 10 may be blue, maroon, yellow, beige, or patterns such as plaid, polka-dotted, clear, striped or any combination thereof. Packs may by camouflaged and/or otherwise undetectable except by detection devices such as, for example, devices that detect and/or emit a signal such a transponder, an RFID tag, or another device. Detection can also be by specific frequencies, signal patterns and/or color reflection such as, for example, UV reflection. Additionally, the pack 10 may have a solar film with solar cells that generate energy to power an integrated or otherwise added electronic device for a period of time or a specific period of time. Packs may contain one or more electronic circuits placed within a pack, coupled or affixed to a pack, and/or printed on the pack itself. The electronic circuit can be for one way or two way communications, contain a recorded message or signal that is optionally repeating. Packs may contain passive or active location devices and also may be used for geo-location and/or navigation proposes such as, for example, by receiving and/or sending signals such as, for example, GPS, AM/FM, RFID, shortwave, microwave and/or other signals. In addition, the signals may be detectable via low-flying aircraft, helicopters, drones, or other aircraft such as a balloon, a dirigible or other manned or unmanned airship. Alternatively or in addition, packs may also contain embedded and, preferably largely undetectable structures that allow for RF retroreflection and, also preferably, specific identification. Preferably these methodologies are created on packs with 2D or 3D printers.

To aerially distribute the packs 10, a skilled artisan may select any suitable aerial distribution system, as desired. As non-limiting examples, the distribution system may be substantially as described in U.S. Pat. No. 4,349,168 entitled "Cargo Delivery System for Aircraft," hereby incorporated herein by reference in its entirety; U.S. Pat. No. 4,241,890 entitled "Aerial Delivery System," hereby incorporated herein by reference in its entirety, and U.S. Pat. No. 4,374,578 entitled "Aerial Cargo Delivery System," hereby incorporated herein by reference in its entirety.

In preferred embodiments, containers or magazines holding a desired number of the packs 10 are disposed in a cargo hold of an airplane, such as a C-130, for example. Any suitable method for loading the packs 10 onto the airplane may be employed. For example, the containers may be loaded on the airplane using the system and method described in U.S. Pat. App. Pub. No. 2008/0219830 entitled "Channel Slide Cargo Handling System and Method," hereby incorporated herein by reference in its entirety. The containers may be disposed in rows and columns as is customary for the cargo of airplanes. The containers may include desired quantities of packs 10 and types of supplies, and may be prepared and stored at strategic locations across the U.S. and the world awaiting distribution in the event of a military operation or natural disaster.

In an exemplary embodiment, a rear hatch of the airplane is closed during transport of the containers to a desired location, and a conveyor system disposed underneath the containers is retracted. Once the airplane has reached a desired location, the rear hatch of the airplane is opened and the conveyor system is extended from the cargo hold. The packs 10 in the containers are then emptied onto the conveyor system, and the conveyor system causes the packs 10 to exit the airplane from the rear hatch for aerial distribution to people on the ground. It is understood that the packs 10 of a container may be emtied en masse, or the packs 10 may be individually metered onto the conveyor system at a desired rate. The packs 10 are conveyed from the containers and out of the airplane so that the packs 10 are not bunched or clustered together, and that separation of each pack 10 from the other packs 10 is achieved.

It has also been surprisingly discovered that when a plurality of packs 10, as shown in FIGS. 1-10, are distributed from an elevated point above the ground such as from an airplane, substantially all of the packs 10 are oriented with the aerodynamic component 32, 34 between the sheet 18 and the ground. Such orientation results in the aerodynamic component 32, 34 being caught by the air and extending outwardly to minimize a terminal velocity of the packs 10. The orientation of the aerodynamic component 32, 34 further advantageously results in a random and even distribution of the packs 10 across the ground above which the packs 10 are deployed.

Due to the size of the packs 10, the proportions of the contents of the of the inner package 12 thereof, and the materials from which the packs 10 are formed, the packs 10 are adapted to reach a desired peak terminal velocity that is sufficiently low such that the pack 10 does not harm people or property on the ground. As discussed herein, the size, weight, and nature of the contents of the packs 10 will dictate the materials used to form the inner and outer packages 12, 14 and the size of the pack 10.

The aerodynamic components 32 and 34 of the packs 10 advantageously provide a wind resistant structure that further minimizes the terminal velocity thereof. The rigid inserts 40 optionally incorporated into the pack 10 provide rigidity to militate against the bending or folding of the pack 10 during the aerial distribution. By militating against bending or folding, the surface area of the pack 10 contacted by air is maximized, thereby reducing, and in some instances minimizing, the terminal velocity of the pack 10. In addition, packs can be created with no or minimal angles for low radar observance. Angles can be rounded or, preferably eliminated. Preferred structures for packs may be round, rounded, oval or otherwise without sharp angles.

By distributing the packs 10 individually rather than on pallets, a wider distribution of supplies contained therein may optionally be achieved, and hoarding of the supplies is more difficult, thereby ensuring more people receive the necessary supplies.

As shown in FIGS. 11-17, the present disclosure also includes a continuous system 100 for producing a pack 10. Other types of packs 10 may also be manufactured with the system 100 of the present disclosure.

Figure 11:
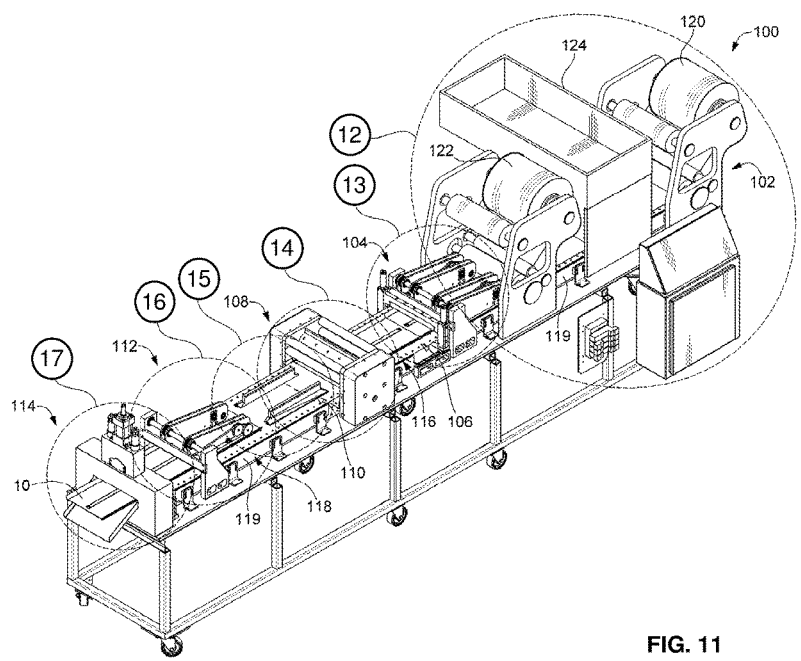
FIG. 11 is a side perspective view of a system for producing an emergency pack.

Referring to FIG. 11, the system 100 for manufacturing the pack 10 includes a product loading unit 102, a longitudinal mid-pack and edge sealing unit 104, a transverse heat sealing unit 106, a perforator unit 108, a wing folding unit 110, a wing band sealing unit 112, and a pack separator unit 114. The system 100 also includes a pair of longitudinally extending conveyors 116, 118 disposed in sequence, hereinafter referred to as the first conveyor 116 and the second conveyor 118, for continuously transporting the pack 10 and related subcomponents of the pack 10 through the system 100. Each of the first conveyor 116 and the second conveyor 118 may be in communication with at least one vacuum plenum 119 configured to secure the pack 10 and the related subcomponents of the pack 10 to the first conveyor 116 and second conveyor 118 as the pack 10 is manufactured.

Figure 12:
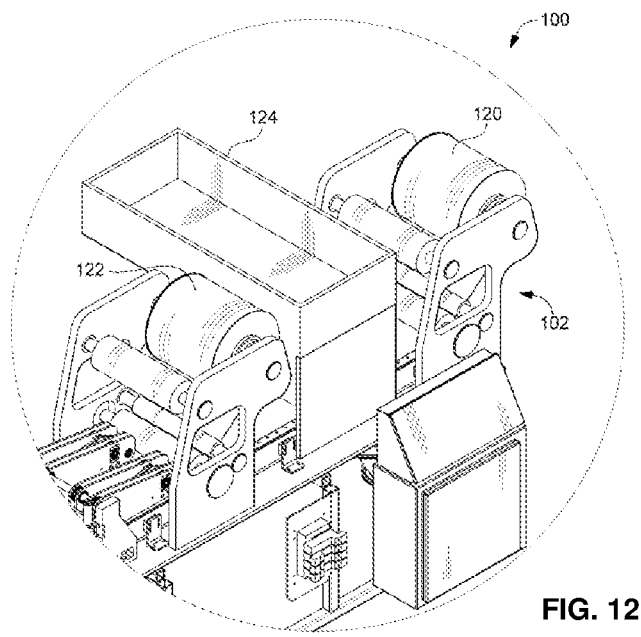
FIG. 12 is an enlarged fragmentary side perspective view of the system identified by callout 12 in FIG. 11, further showing a product loading unit of the system.

With reference to FIG. 12, the product loading unit 102 is configured to deposit an inner package including an item for aerial delivery between a first sheet and a second sheet. The product loading unit 102 may include a first sheet supply roll 120, a second sheet supply roll 122, and a product loader 124. The first sheet supply roll 120 provides the first sheet, the second sheet supply roll 122 provides the second sheet, and the product loader 124 provides the inner package for the pack 10. The first sheet supply roll 120 continuously provides the material forming the first sheet for the pack 10. As the first sheet is advanced from the first sheet supply roll 120, a printer may print desired indicia thereon. For example, the printer may be used to print a date of creation, date of expiration, tracking information and indicia, and the like. The first sheet may be advanced through the system 100 by the first conveyor 116. One of ordinary skill should understand that the first sheet may be advanced through the system 100 by alternative means, such as pairs of cooperating driven rollers, as desired. Additionally, the first sheet may be comprised of multiple layers as described herein.

As the first sheet is advanced adjacent the product loader 124, the inner packages are deposited on the first sheet by the product loader 124 at desired intervals. Positive results have been obtained from packs 10 having the inner packages disposed along a substantially central longitudinally extending axis of the first sheet. The inner packages in the product loader 124 may contain the same supplies, or the inner packages may contain different supplies, as desired. For example, a quantity of water-containing inner packages may be supplied to the first sheet on the first conveyor 116, or the inner packages may alternatingly contain water, food, and personal hygiene supplies, for example. In certain embodiments, the packs may be empty and filled at a later time or place.

The second sheet supply roll 122 continuously provides the material forming the second sheet for the pack 10. The second sheet may be distributed from the second sheet supply roll 122 by a pair of overwrap rolls and over the inner package and the first sheet, for example. Other suitable means for distributing the second sheet over the inner package and the first sheet may also be employed, as desired. The second sheet may be identical to the first sheet or may be different from the first sheet.

Figure 13:
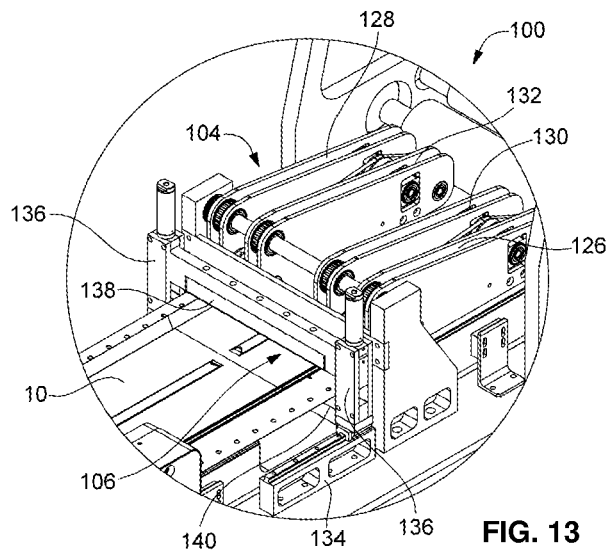
FIG. 13 is an enlarged fragmentary side perspective view of the system identified by callout 13 in FIG. 11, further showing a longitudinal mid-pack and edge sealing unit and a transverse heat seal unit of the system.

After the inner package has been disposed between the first and second sheets, the assembly including the inner package and the first and second sheets is advanced to the longitudinal mid-pack and edge sealing unit 104, for example, as illustrated in FIG. 13. The longitudinal mid-pack and edge sealing unit 104 seals the first sheet and the second sheet to form an outer package housing the inner package. The longitudinal mid-pack and edge sealing unit 104 may be a heat sealer, for example, although other means for sealing the inner package between the first and second sheets may also be employed within the scope of the disclosure.

In a particular embodiment, the longitudinal mid-pack and edge sealing unit 104 heat seals both side edges of the first and second sheets and mid-pack locations of the first and second sheets adjacent the inner package. As a non-limiting example, the longitudinal mid-pack and edge sealing unit 104 may include a pair of side sealing bands 126, 128 configured to heat seal the side edges of the first and second sheets. The longitudinal mid-pack and edge sealing unit 104 may also include a pair of mid-pack sealing bands 130, 132 configured to heat seal the mid-pack areas of the first and second sheets adjacent the inner package.

As shown in FIG. 13, the transverse heat sealing unit 106 of the system 100 is disposed adjacent the longitudinal mid-pack and edge sealing unit 104. At the transverse heat sealing unit 106, top edges and bottom edges of each of the first and second sheets of the unsealed pack 10 are sealed. The transverse heat sealing unit 106 includes a pair of linear rail mount blocks 134 on which a pair of heat seal cylinders 136 are movably mounted. The linear rail mount blocks 134 may include bearings, for example, and be biased, for example, with a spring or the like, to return to a first location proximal the longitudinal mid-pack and edge sealing unit 104 after being moved to a second location by the first conveyor 116. The heat seal cylinders 136 selectively actuate an upper heat seal bar 138 and a lower heat seal bar 140.

The partially sealed pack 10 is advanced to the transverse heat sealing unit 106, for example, by the first conveyor 116. The top edges of the of the first and second sheets are first sealed by an actuation of the upper and lower heat seal bars 138, 140 by the heat seal cylinders 136, which causes the upper and lower heat seal bars 138, 140 to compress and heat the first and second sheets there between at the first location. The heat seal cylinders 136 and the upper and lower heat seal bars 138, 140 advance with the unsealed pack 10 via coupling the first conveyers, which moves via a positive coupling with the first conveyor, along the linear rail mount blocks 134. After a predetermined period of time, which time is sufficient to cause the top edges of the first and second sheets to be sealed, the heat seal cylinders 136 cause the upper and lower heat seal bars 138, 140 to lift from the first and second sheets. The upper and lower heat seal bars 138, 140 are lifted from the first and second sheets at the second location. The upper and lower heat seal bars 138, 140 are then returned to the first location, and the process repeated in order to seal the bottom edges of the first and second sheets. It is understood that the steps that generate the longitudinal mid-pack and edge seals and the top and bottom edge seals may occur in a reverse order to that presently described, or may occur substantially simultaneously, as desired. In certain embodiments, at least one edge is left unsealed so that the pack can be filled at a later time or place, after which the remaining edges are sealed.

The transverse heat sealing unit 106 may also be employed to secure a top edge and a bottom edge of the at least one inner package between the first sheet and the second sheet with a top transverse seal and a bottom transverse seal. For example, the upper heat seal bar 138 and the lower heat seal bar 140 may have raised portions that create each of the top and bottom transverse seals and the top and bottom edge seals. Other means for forming the top and bottom transverse seals, to couple the inner package with the outer package, may also be used within the scope of the present disclosure.

Once the longitudinal mid-pack and edge seals and the transverse top and bottom edge seals are formed, each pack 10 is caused to move past the heat transverse heat sealing unit 106 by the first conveyor 116 to a perforator unit 108. The perforator unit 108 is disposed between the transverse heat sealing unit 106 and the wing folding unit 110. The perforator unit 108 transversely perforates the first and second sheets of the each pack 10 to facilitate separation of the individual packs 10. Additionally, the perforator unit 108 forms a perforation to facilitate an opening of the pack 10.

Figure 14:
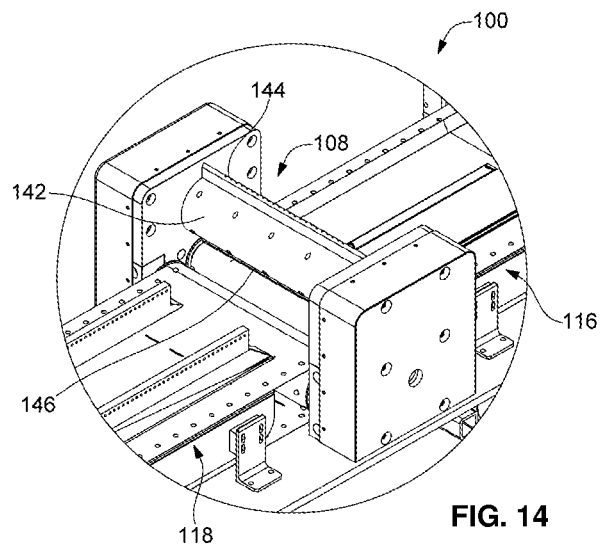
FIG. 14 is an enlarged fragmentary side perspective view of the system identified by callout 14 in FIG. 11, further showing a perforator unit of the system with an outer cover removed to show a perforating roller and an anvil roller of the perforator unit.

In a particular embodiment shown in FIG. 14, the perforator unit 108 includes a perforation roller 142 with at least one perforation blade 144. The perforation roller 142 is disposed opposite an anvil roller 146. It should be appreciated that the first conveyor 116 ends adjacent one side of the perforator unit 108, the second conveyor 118 begins adjacent the other side of the perforator unit 108, and the perforation roller 142 and anvil roller 146 are disposed between the first conveyor 116 and the second conveyor 118. The perforation blade 144 of the perforation roller 142 cooperates with the anvil roller to perforate the packs 10 as they pass there between. The perforation blade 144 may have a linear portion for perforating a width of the emergency packs for separation thereof, and an angular portion for formation of a perforated opening for the packs 10. The angular portion may be substantially V-shaped, for example. The perforation blade 144 may have other shapes, as desired. Other means for perforating the packs 10 may also be employed within the scope of the present disclosure.

Figure 15:
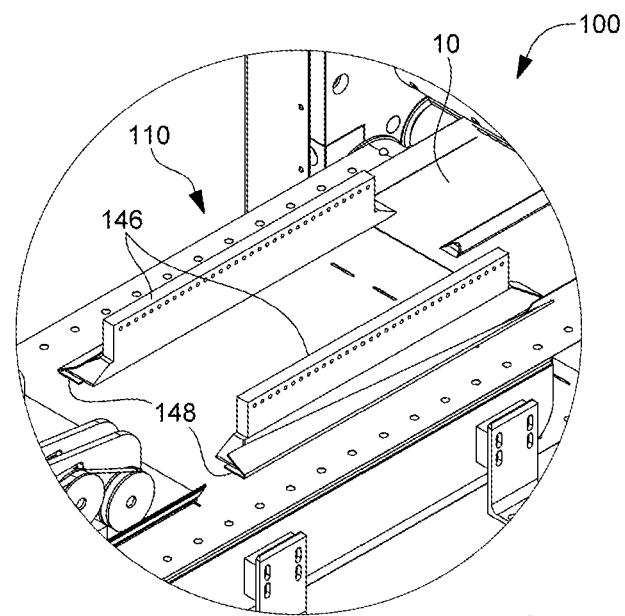
FIG. 15 is an enlarged fragmentary side perspective view of the system identified by callout 15 in FIG. 11, further showing a wing folding unit of the system, an emergency pack removed from the wing folding unit to show a guide plate of the wing folding unit.
Figure 16:
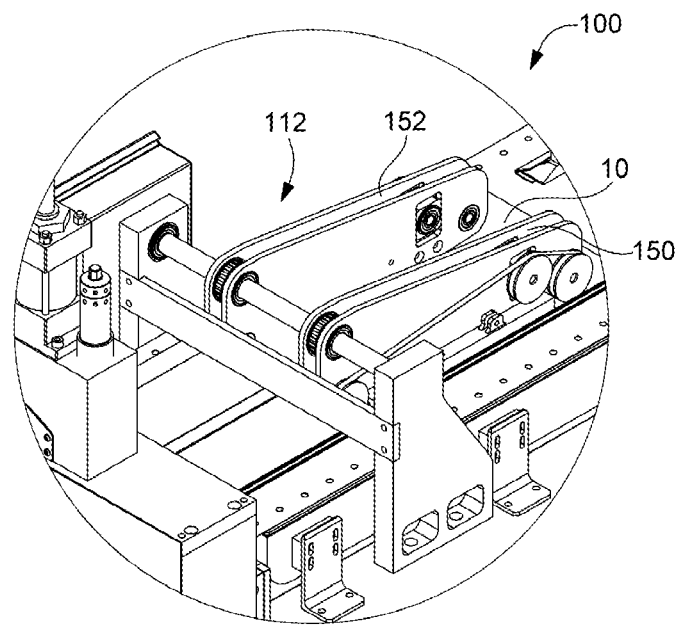
FIG. 16 is an enlarged fragmentary side perspective view of the system identified by callout 16 in FIG. 11, further showing a wing band sealing unit of the system.

Referring now to FIGS. 15 and 16, the present system 100 further includes a wing folding unit 110 and a wing band sealing unit 112. The wing folding unit 110 and the wing band sealing unit 112 are configured to form a pair of aerodynamic elements such as wings on the outer package adjacent the at least one inner package. The aerodynamic elements preferably cause turbulent flow across the outer package and reduce or minimize a descent rate of the pack 10 in operation, as the pack 10 is falling through the air. The aerodynamic elements also may contribute to reducing or minimizing a descent rate of the pack 10 in operation, as the pack 10 is falling through the air.

As the perforated packs 10 are advanced by the second conveyor 118, the wing folding unit 110 folds a portion of the side edges of the packs 10. For example, the wing folding unit 110 includes a pair of spaced apart folder bases 146 and a pair of folder guide plates 148 disposed adjacent the spaced apart folder bases 146. The side edges of the packs 10 are advanced through the folder guide plates 148, which fold each side edge to form the drag elements of the packs 10.

Following the folding of the side edges of the packs 10, the folded side edges are heat sealed with the wing band sealing unit 112, for example, as shown in FIG. 16 Like the longitudinal mid-pack and edge sealing unit 104 and the transverse heat sealing unit 106 of the system 100, described hereinabove, the wing band sealing unit 112 is employed to seal the first and second sheets of the packs 10. In particular, the wing band sealing unit 112 may include a pair of heated sealing bands 150, 152 that compress and heat the folded edges to form wing seals. The wing band sealing unit 112 simultaneously forms the drag elements and side sealing edges of the packs 10. It should be understood that the aerodynamic elements or "wings" of the packs 10 are closed as formed, but open in operation, as the pack 10 is falling through the air.

In another embodiment of the present disclosure, rigid inserts may be disposed adjacent the side edges of the first and second sheets prior to heat sealing by the wing band sealing unit 112. The rigid inserts may be heat sealed into the aerodynamic elements or adjacent the sealing edges between the side edge seals and the mid-pack seals, as desired.

Figure 17:
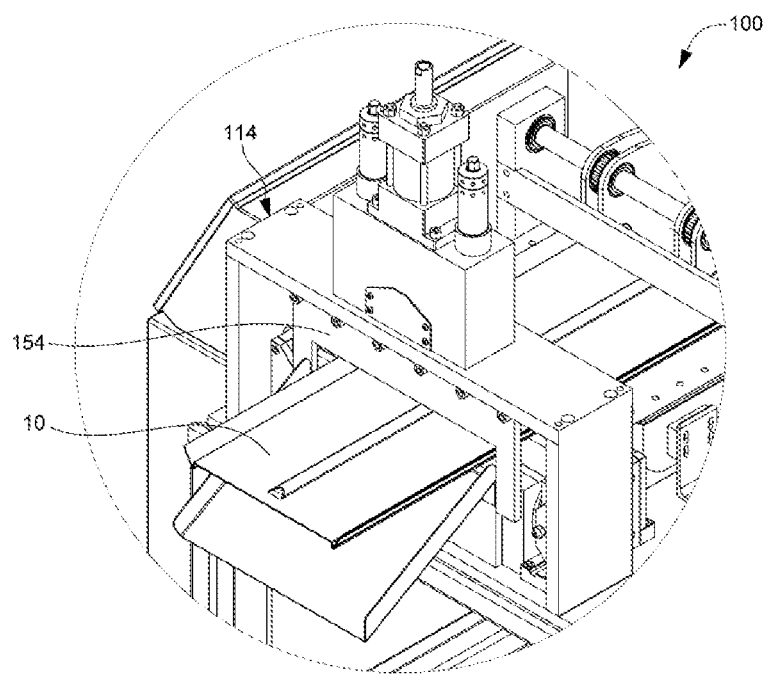
FIG. 17 is an enlarged fragmentary side perspective view of the system identified by callout 17 in FIG. 11, further showing a package separator unit of the system with an outer cover removed to show a guillotine of the package separator unit.

With reference to FIG. 17, the system 100 further may include a package separator unit 114. The package separator unit 114 is disposed adjacent the wing band sealing unit 112, for example. The package separator unit 114 may include a guillotine 154. The guillotine 154 is configured to cut along at least a portion of the perforation formed by the perforator unit 108 and thereby separates each pack 10. The guillotine 154 thereby forms individual ones of the pack 10. As the packs 10 exit the system 100, the packs 10 are collected and stored for transport and distribution. The packs 10 may be collected in a container with no organization to the packs 10. Alternatively, the packs 10 may be collected in an organized manner resulting in stacked packs 10. For example, the container may be a pack magazine containing a desired number of packs 10 stacked with the inner package of pack 10 offset from the inner package of adjacent packs 10. Other means for collecting the individual packs 10 may be employed, as desired.

In another embodiment, the individual packs 10 are not separated by the package separator unit 114, to provide a linear "string" of packs that are separated during deployment.

The present disclosure further includes a method for manufacturing the pack 10. The method may be used with the system 100 of the present disclosure, or another system, as desired. The method first includes the step of providing the first sheet and the at least one inner package including the item for aerial delivery. The inner package is then deposited on the first sheet. A second sheet is disposed over the inner package and the first sheet. The first sheet and the second sheet are then sealed to form the outer package housing the inner package. The at least one aerodynamic element is formed on the outer package, for example, adjacent the at least one inner package. The aerodynamic element preferably causes turbulent flow across the outer package and reduces or minimizes the descent rate of the pack in operation. The aerodynamic element may also reduces or minimizes the descent rate of the pack in operation.

The step of sealing the first sheet and the second sheet may include forming a top edge seal, a bottom edge seal, and spaced apart side edge seals on the first sheet and the second sheet. The step of sealing the first sheet and the second sheet may also include forming a pair of mid-pack seals. The inner package is confined within the outer package by the pair of mid-pack seals, the top edge seal, and the bottom edge seal.

The step of forming the at least one aerodynamic element may include folding corresponding side edges of the first sheet and the second sheet. The folded edges are sealed, for example, between the side edge seals and the mid-pack seals, to form wing seals.

The inner package may also be coupled to the outer package of the pack 10. For example, the top edge and the bottom edge of the at least one inner package may be sealed between the first sheet and the second sheet with the top transverse seal and the bottom transverse seal. The inner package is thereby coupled to the outer package. Other suitable means for coupling the inner package with the outer package, including adhesives, fasteners, and the like, may also be employed.

The pack 10 of the present disclosure may also be perforated to facilitate both a separation of the packs 10, and an opening of individual packs 10. For example, the perforation may extend inwardly from the top edge of the pack 10. The perforation may traverse at least one of the top edge seal, the top transverse seal, and the bottom transverse seal, in order that the seals may be opened. Access to the inner package is thereby permitted.

A method and system for manufacturing a cost-effective pack for supplies that may be easily air dropped and distributed to a large number of people, with a minimized risk of damage to the supplies and to the people collecting the supplies, is thereby provided.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. A system for aerial distribution to persons on the ground, comprising:
   a pack having an outer package consisting essentially of two superimposed sheets of material coupled together;
   at least one electronic circuit coupled to the pack;
   at least one storage device coupled to the at least one electronic circuit storing a recorded massage; and
   a pair of wings extending from the outer package that unfurl during an aerial delivery of the pack, wherein each wing is formed by folding corresponding side edges of the superimposed sheets.

2. The system of claim 1, further comprising a tracking device, wherein the tracking device is at least one of a GPS device, an RFID device, and a sensor device.

3. The system of claim 1, further comprising a communication device coupled to the at least one electronic circuit, wherein the communication device is at least one of a sound generating device, a signal sending and receiving device, and a visual communication device.

4. The system of claim 3, wherein the signal sending and receiving device is at least one of an AM, FM, and short waive radio.

5. The system of claim 3, wherein the sound generating device is at least one of a buzzer, a whistle, and a beeper.

6. The system of claim 3, wherein the visual communication device is at least one of an illuminating device, a reflective material, instructional material, and colored or symbolic indicia.

7. The system of claim 1, wherein the at least one electronic circuit is stored within the outer package.

8. The system of claim 1, wherein the outer package and the wings are manufactured of the same material and as a single unit.

9. The system of claim 1, further comprising at least one rigid element disposed between the superimposed sheets of material of the outer package.

10. The system of claim 1, wherein the wings reduce descent rate of the pack in comparison to freefall by increasing turbulent flow during descent.

11. The system of claim 1, wherein the outer package stores at least one item chosen from the group consisting of one or more of mosquito netting, a tent, a blanket, one or more tools, one or more batteries, a shelter, clothing, foot protection, rain gear, one or more hygienic supplies, one or more first aid supplies, ammunition or weapons, one or more parts for vehicles or equipment, one or more water purification supplies, one or more filters to remove contaminants from water, food, water, medication, a fire-starting kit, fuel, and video or paper information.

12. The system of claim 1, wherein the at least one aerodynamic component extends from an edge of the outer package.

13. The system of claim 1, wherein the superposed sheets are comprised of opposing faces that are joined together.

14. The System of claim 13, wherein the superposed sheets are comprised of RF reflective material.

15. The system of claim 13, wherein the superposed sheets are comprised of a plurality of layers.

16. The system of claim 1, wherein at least one inner package is confined within the outer package.

17. The system of claim 16, wherein the at least one inner package allows the at least one item to move freely or in a specified range within the inner package.

18. The system of claim 16, wherein the at least one item is fixed within the inner package.

19. The system of claim 16, wherein the at least one inner package is coupled to the outer package.

20. The system of claim 1, wherein the at least one electronic circuit is printed onto the outer package.

* * * * *